Feb. 3, 1953 N. H. NYE 2,627,213
APPARATUS FOR MAKING THERMOPLASTIC RESIN BAGS
Filed Nov. 4, 1949 4 Sheets-Sheet 2
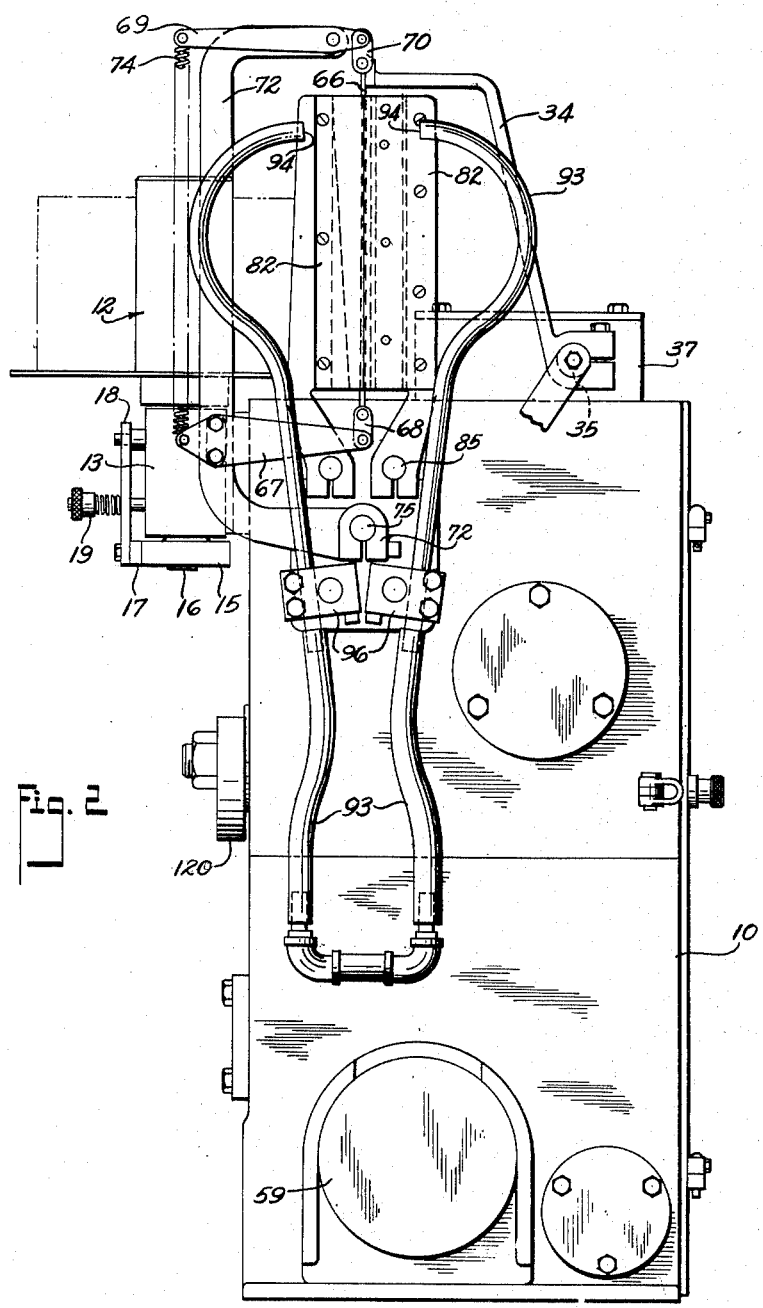
INVENTOR.
NORMAN H. NYE
BY
Richey Watts
ATTORNEYS Feb. 3, 1953 N. H. NYE 2,627,213
APPARATUS FOR MAKING THERMOPLASTIC RESIN BAGS
Filed Nov. 4, 1949 4 Sheets-Sheet 3
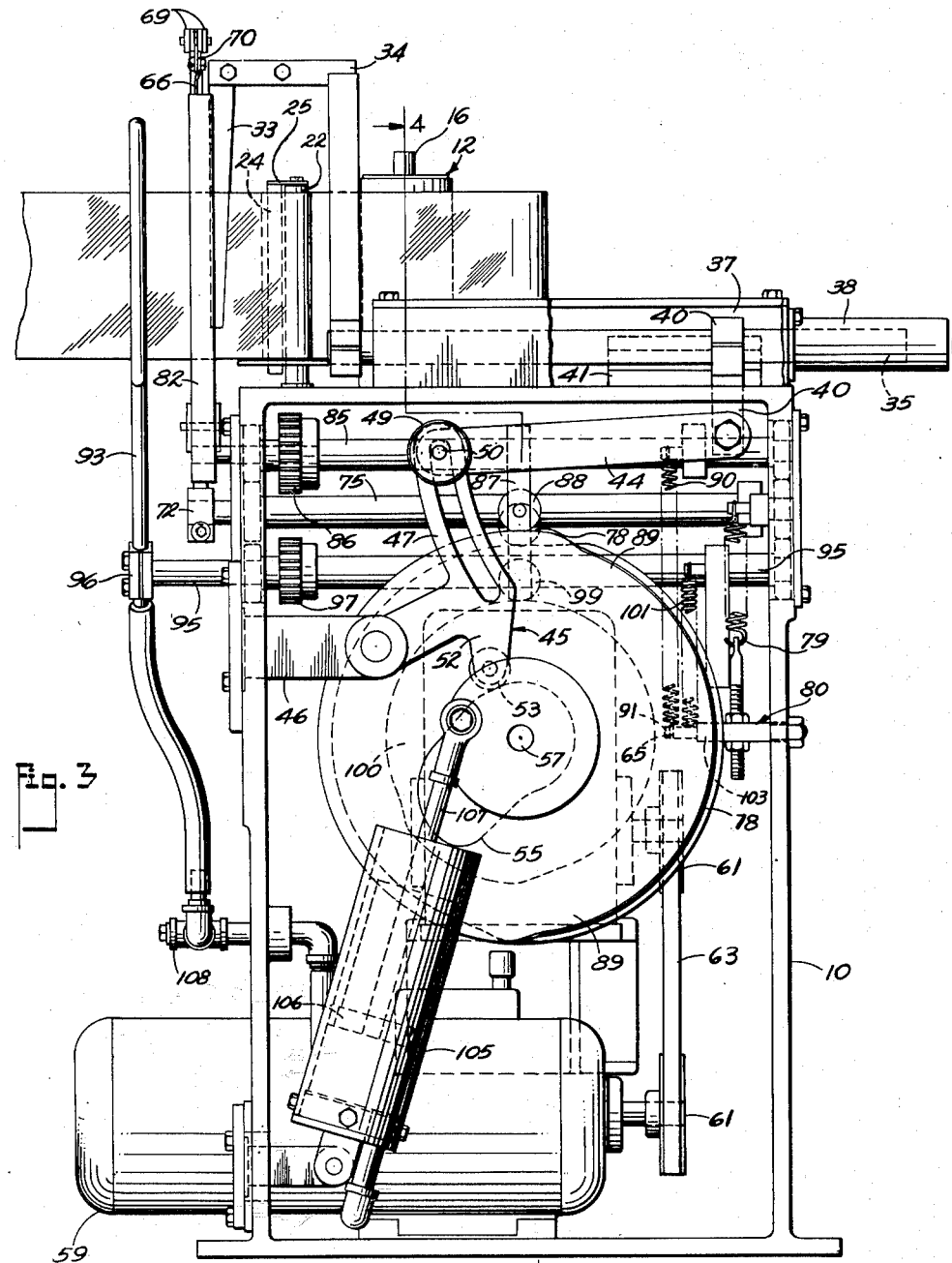
INVENTOR.
NORMAN H. NYE
BY
Richey Watts
ATTORNEYS

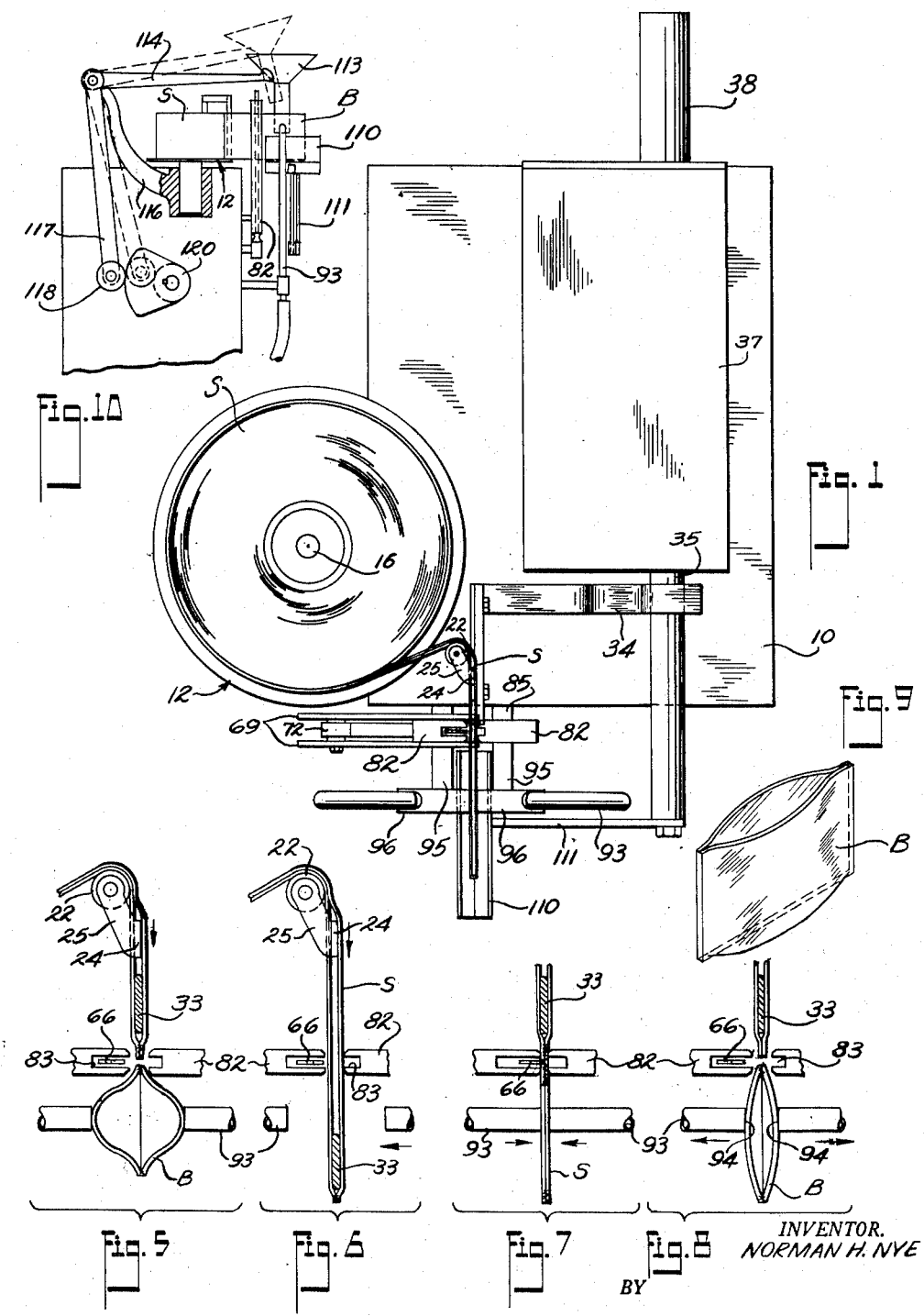

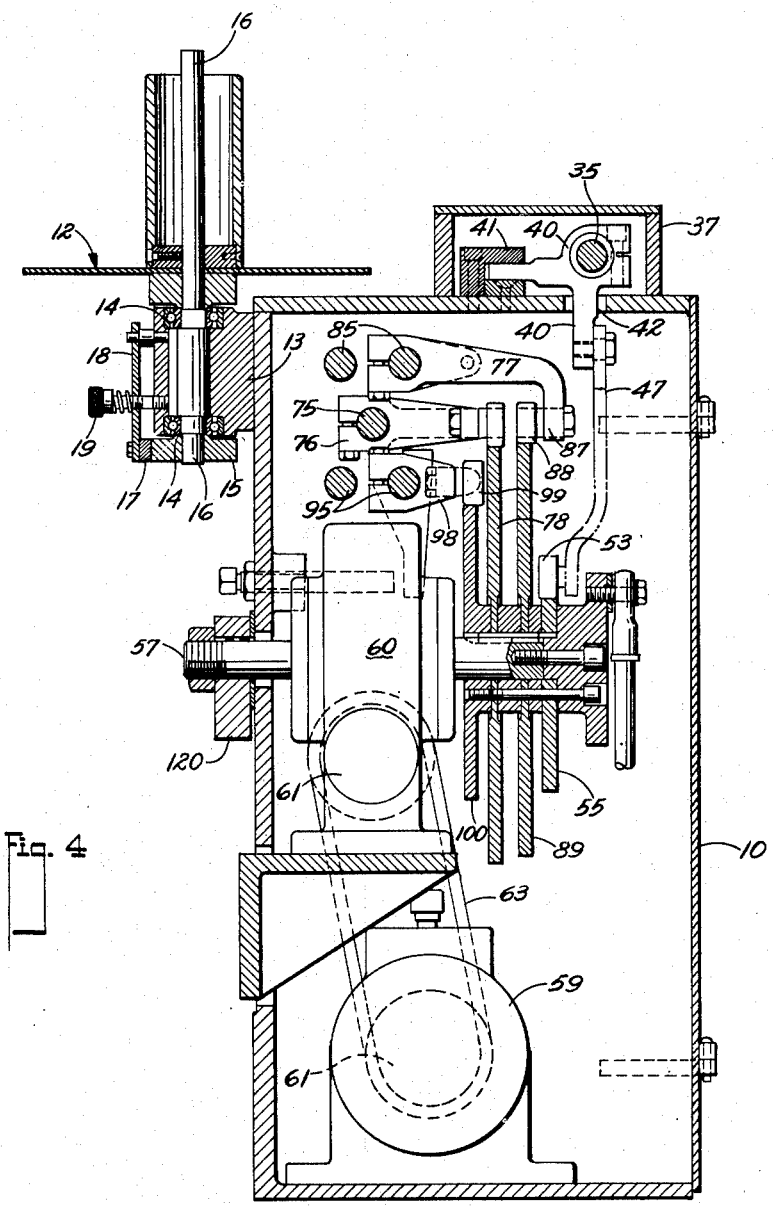

Patented Feb. 3, 1953

2,627,213

UNITED STATES PATENT OFFICE 2,627,213

APPARATUS FOR MAKING THERMOPLASTIC RESIN BAGS

Norman H. Nye, Cuyahoga Falls, Ohio

Application November 4, 1949, Serial No. 125,477

6 Claims. (Cl. 93—8)

1

The present invention relates generally to the packaging art and is more particularly concerned with a new and useful method of making vessels such as tubes, bags or envelopes from thin sheets of thermoplastic material, and with unique apparatus effectively implementing that method.

It is a primary object of my present invention to make vessels of thin, sheet, thermoplastic materials practically and commercially.

It is a further object of my invention to provide a practical and commercial method of packing articles and substances.

It is another object of my invention to enable the rapid, automatic manufacture of thin-walled thermoplastic bags of uniform shape and dimensions.

It is still another object of my invention to provide a method for rapidly and automatically packaging individually, articles and substances and the like in bags consisting of thermoplastic material in the form of thin sheeting.

It is an additional object of this invention to provide apparatus effectively implementing the aforesaid methods.

Generally, the method of this invention comprises the steps of bringing a heated element into contact with an assembly of a plurality of superimposed layers of thermoplastic resin sheet material and thereby severing each layer, substantially simultaneously heat-sealing together the resulting cut edges of the layers, moving the assembly relative to said heated element, and repeating the cutting and sealing operations on another portion of the assembly. Preferably, where a bag is to be produced, an elongated sheet of the said thermoplastic resin material will be doubled lengthwise as a preliminary step and the doubled sheet will be cut transversely by the said heat element at predetermined spaced places. A member or finger disposed between the sides of the sheet will then be brought against a sealed portion of the sheet to advance the sheet lengthwise between the two cutting operations, and then will be moved back out of the way so that the second cut can be made to complete the bag.

In accordance with my preferred practice of this invention, a longitudinally-folded thermoplastic sheet is heat-sealed along its leading, opposed transverse edges, whereupon a finger which has been inserted between the sides of the sheet and is moved against the sealed leading edge portion of the sheet to push the sheet in a direction substantially at right angles to the said sealed portion. After the sheet has thus been moved a predetermined distance, slightly greater than the length of the desired bag, the finger is moved in the opposite direction to its starting position, the sheet is cut transversely just ahead of the finger, and the resulting opposed edges are heat-sealed together thus providing a bag closed along its bottom and side portions, and open along its top portion.

This invention as applied to packaging a substance such as a powder or an article such as a ball bearing, comprises the steps set forth above and in addition includes the step of drawing apart the opposed upper side portions of the finished bag and the step of inserting the ball bearing into the bag as the bag is held open.

The apparatus for carrying out the foregoing methods, broadly speaking, comprises a heated element such as a hot wire to engage and cut transversely and seal the thermoplastic sheet at predetermined intervals, means for reciprocatingly moving this wire relative to the sheet, means including a blade or finger extending between the sides of the sheet, and means associated with the blade for reciprocating it and thereby progressively moving the sheet in timed relation with the wire.

Those skilled in the art will gain a further understanding of the method and the apparatus of my present invention upon consideration of the following detailed description, reference being had to the drawings accompanying and forming a part of the specification, in which:

Fig. 1 is a plan view of an automatic bag-making machine embodying this invention in a preferred form.

Fig. 2 is an end elevational view of the machine of Fig. 1;

Fig. 3 is a side elevational view of the machine of Fig. 3, portions of the housing thereof being removed for clarity;

Fig. 4 is a vertical sectional view taken approximately on line 4—4 of Fig. 3, the thermoplastic sheet stock, however, being removed in the interest of clarity;

Figs. 5, 6, 7 and 8 are enlarged, fragmentary, plan views of sheet cutting and sealing apparatus, the stationary means for guiding the sheet and separating opposed sides thereof, the finger for pushing the sheet along intermittently and the means for opening top of the resulting bag, and they show how these various elements of the Fig. 1 machine cooperate through several stages to produce the desired results;

Fig. 9 is a perspective view of a typical thermoplastic bag produced in accordance with this invention by the illustrated apparatus; and, Fig. 10 is a fragmentary, side elevational view of the Fig. 1 machine with certain parts removed or broken away and with bag-loading apparatus including a funnel-like member added thereto.

The apparatus generally described above is largely enclosed in a box-like housing 10, certain elements, however, necessarily being outside the housing, but secured thereto and supported thereby. Stock to be cut up into sections and sealed, as described above, to produce a number of separate bags, is carried in coil form on a vertical spindle 12 extending above the top of the housing and secured rotatably thereto by means of an apertured bracket 13 welded to one side of housing 10 and carrying a pair of ball bearing races 14. Brake means including a brake drum 15 keyed to the lower end of spindle shaft 16, a brake shoe 17, a holder 18 for the shoe and an adjusting stud 19 engaging the holder and bracket 13, are provided to enable control over spindle shaft rotation and tension in the stock during processing.

As shown in Figs. 1, 5 and 6, a stationary, upstanding guide roller 22 is secured rotatably to the top of housing 10 adjacent to spindle 12 to guide stock being stripped from roll S in its travel toward the processing stations of the apparatus. A stationary knife member 24 is disposed adjacent to the roller and depends from a bracket 25 secured to the roller support in such a position as to extend between opposed sides of the folded sheet stock to separate these sides as the stock travels between roller 22 and the said processing stations. Sheets of thermoplastic resin stock such as polyetheylene have a tendency, when folded longitudinally and set up in a roll, to cling together. I have found, however, that once two such sheets are separated, they have no tendency to join together again and stick together in the course of the present process. It is, therefore, not necessary that knife 24 be movable or that it be placed very closely adjacent to the subsequent station to assure delivery of the stock thereto in condition for ready conversion to bag form.

The means for uncoiling the stock around guide roller 22 and moving it through the various processing motions comprises a vertically disposed thin, flat metal finger 33 supported at its upper end by means of a bracket 34 of generally L-shape in both plan and end views (Figs. 1 and 3). The finger in use normally extends downwardly into the space between opposed sides of sheet S, as indicated in Figs. 3 and 5 to 8, inclusive. At its lower end remote from the finger, bracket 34 is fastened to the front end of a reciprocating shaft 35 which is partially disposed in a small, box-like housing 37 secured on top of housing 10. At the rear of housing 37 an opening is provided through which the rear end of this shaft may extend and a shaft guard 38 is secured to the housing around this opening. Intermediately of its ends shaft 37 is fastened to a cross head 40 carried on a cross head slide 41 and having a portion which extends downwardly through a slot 42 in the top of housing 10 and in turn is secured pivotally to a substantially horizontally extending elongated link 44. A bell crank 45 having one leg pivoted to a bracket 46 secured to housing 10, has an upwardly extending leg 47 which is slotted to receive an adjuster nut 49 held on link 44 by a screw 50 in any of a number of predetermined desired positions available by virtue of the said slot. Another leg 52 of the crank extends generally downwardly and carries a cam roller stud 53. Thus, crank 45 is given a rocking motion, shaft 35 is reciprocated and finger 33 is reciprocated when cam stud 53 runs on a cam disc 55 turning with a shaft 57 to which it is keyed. A suitable driving means such as an electric motor 59 is provided to turn cam shaft 57 through a speed reduction gear indicated at 60, pulleys 61 being associated with said motor and gear and a belt 63 connecting the pulleys and serving to transmit the driving force to the cam shaft.

In order to bring finger 33 back to its starting position after each actuation, means such as a spring (not shown) may be provided in the foregoing system being attached slidably to link 44 and anchored to housing 10. If however, the parts including the bell crank and the link 44 are heavy enough, such a spring will not be necessary to keep cam roller 53 in firm engagement with the cam disc.

The preferred cutting and sealing device, that is, flat hot wire 66, is suitably electrically heated, as by means disclosed in U. S. Patent 2,248,248, granted July 8, 1949 to Norman H. Nye, Ralph L. Penn, and Ralph W. Penn. However, it will be understood that an element heated by other means may be used provided it will cut the material by heat and simultaneously seal the cut edges thereof. This wire is suspended vertically between a bracket 67 disposed below the lower end of the wire and coupled thereto by means of a spacer 68, and a pair of closely-spaced take-up levers 69 disposed above the upper end of the wire and connected thereto by means of a similar spacer 70. Lever 69 and the bracket 67 are carried by means of a frame 72 of generally U-shape and the ends of these parts remote from the wire are conencted by means of a tension spring 74 to assure proper tension in the wire at all times. The lower end of frame 72 is socketed for keyed engagement with a horizontally extending shaft 75 one end portion of which extends through the forward end of housing 10 while the remainder thereof is exposed within the housing and is rotatably supported thereby. Between its ends and within the housing shaft 75 is provided with a cam lever 76 carrying a cam roller 77. A disc cam 78 keyed to cam shaft 57 engages roller 77 and causes reciprocating rotary motion of shaft 75 on its axis at predetermined intervals, and also causes rocking motion of wire 66 through a vertical arc around said shaft 75 as a pivot. A spring 79 secured to shaft 75 and anchored to housing 10 as indicated at 80, resiliently opposes turning of said shaft to carry the wire away from the stock and assures a positive force at all times available to return the wire to its cutting engagement with the stock.

To hold stock in position during the cutting operation and to protect the wire at all times, a pair of opposed pressure bars 82 are provided, these bars having opposed recesses in which wire 66 may be disposed. Bars 82 extend substantially the full vertical height of the wire only the extreme end portions of the wire in the vicinity of spacers 68 and 70 being exposed. At their lower ends, these pressure bars are keyed to two horizontally disposed shafts 85 carried rotatably by housing 10 above shaft 75. Shafts 85 are operatively associated by means of a pair of gears 86 keyed thereto and one of these shafts carries a cam lever 87 provided with a cam roller 88. A third disc cam 89 is provided for engagement with roller 88 and is keyed to cam shaft 57 whereby reciprocating rotary motion of shafts 85 can be obtained so that the pressure bars will be moved toward and away from each other in the manner indicated in Figs. 5 to 8, inclusive. To assure return of the pressure bars to the open position after each closing of them under the positive action of cam 89, a spring 90 is provided, being connected to one of the shafts 85 after the manner of spring 79 and being anchored to housing 10 as indicated at 91.

Two opposed, suction tubes 93 disposed forwardly of pressure bars 82 are provided with inlet openings 94, which may be brought close together for engagement with the upper portions of a bag B produced in the machine as described above. Tubes 93 are both capable of rocking motion in vertical arcs through relatively small distances, being pivoted to two shafts 95 by means of two clamps 96. Shafts 95 are disposed below shafts 75 and 85 but extend beyond them. These shafts 95 are, however, journalled in and largely contained within housing 10 and are geared together by means of gears 97 keyed to the shafts. One of shafts 95 is provided with a cam lever 98 which carries a cam roller 99 to run on the periphery of still another cam disc 100 to produce the desired motion of the suction tubes, said cam 100 being keyed to cam shaft 57, as indicated in Fig. 4. To the same ends that springs 79 and 90 are provided, another tension spring 101 is secured to one of the shafts 95 and is anchored to housing 10 as indicated at 103.

Suction tubes 93 are intermittently provided with negative pressure when necessary to open bag B for loading with ball bearings and the like. The means whereby this result is obtained comprises a cylinder 105 pivoted to the lower portion of housing 10 and disposed therein, and a piston 106 in the cylinder and connected to cam disc 55 by rod 107 for reciprocating motion. Cylinder 105 has the usual inlet and outlet openings and the inlet openings are connected by means of a T-fitting 108 to the lower ends of each of the tubes 93. Thus, when cam shaft 57 is rotated, piston 106 reciprocates in the cylinder in timed relation to the motion of finger 33 to produce the results shown in Figs. 5 to 8, inclusive.

During the loading operation, bags B are supported individually in a stationary trough 110 situated at the end of the machine adjacent to the cutting and sealing station so that as rapidly as the bags are made they are delivered into the trough and supported thereby while they are opened and loaded and then removed therefrom by any suitable means (not shown). Trough 110 is carried by a bracket 111, which is fastened to the adjacent end of shaft 35 so that the trough is reciprocated with said shaft to carry the bags individually from the cutting and sealing station to the loading station.

Special means to facilitate the loading of articles or substances into the bags are provided, these means being movable to assure delivery of the articles into the bags and also unimpaired movement of the bags into and through the loading station. These means in a preferred form comprise a funnel-shaped member 113, the stem of which normally extends into approximately the mid-section of a bag during the loading operation. Member 113 is carried by a lever 114 which is pivoted to a stationary bracket 116 fixed to the machine housing 10 for movement through a vertical arc of about 10° to 15° as indicated in Fig. 10. Motion of lever 114 is effected by means of a second lever 117 extending generally downwardly and keyed to lever 114 and having a roller 118 rotatably secured to its lower end. Roller 118 runs on a cam 120, which in turn is keyed to and carried by the end portion of shaft 57 extending through housing 10.

As this apparatus is operated in accordance with the method described above, finger 33 is disposed between the sides of stock S and with adjacent opposed end portions of the sheeting sealed together, as by previous cutting and sealing operations, wire 66 and pressure bars 82 are in the starting position shown in Fig. 5. The finger is then moved forward between the pressure bars to the position indicated in Fig. 6, cam roller 53 riding the high point of cam 55 at this time. The suction tubes are then brought close together, leaving just enough space between them for the finger to pass through. The finger then is rapidly returned to its original position while the suction tubes are in contact with the sheet material to prevent the said material from being dragged backwards by the finger. The pressure bars are then brought against the sheet, and the flat wire is moved to cut the sheet through and seal the adjacent edges of the material. The wire is then moved away from contact with the sheet material but the pressure bars continue to grip the sheet material while the suction tubes separate a distance to open properly the bag for filling as indicated in Figs. 5 and 8. During the time that the suction tubes are in contact with the sheet material, the piston 106 is on its suction stroke so as to provide a vacuum to hold the sheet material tightly against the ends of the suction tubes. When piston 106 has completed its suction stroke and starts in the opposite direction, the vacuum ceases and the bag is released and the pressure bars separate, allowing the filled bag to drop slightly into trough 110, thus completing the cycle.

Having thus described the present invention so that those skilled in the art may be able to understand and practice the same, I state that what I desire to secure by Letters Patent is defined in what is claimed.

What is claimed is:

1. Apparatus for making bags from a doubled thermoplastic sheet which comprises a hot wire to engage and cut transversely and seal the sheet at predetermined intervals, means for reciprocatingly moving said wire relative to the sheet, means including a blade extending between the sides of the sheet, and means associated with the blade for reciprocatingly moving the blade through a path of travel between the sides of said sheet and progressively moving the sheet in timed relation to said wire.

2. Apparatus for making bags from a doubled thermoplastic sheet which comprises a hot wire to engage and cut transversely and seal the sheet at predetermined intervals, means for reciprocatingly moving said wire relative to the sheet, means for engaging and gripping a portion of the sheet to thus be cut and holding said portion in position during the cutting and sealing of the sheet, means for reciprocating said gripping and holding means relative to said sheet, means including a blade extending between the sides of the sheet, and means associated with the blade for reciprocatingly moving the blade through a path of travel between the sides of said sheet and progressively moving the sheet in timed relation to said wire and sheet-gripping and holding means.

3. Apparatus for making bags from a doubled thermoplastic sheet which comprises means to engage and cut transversely and seal the sheet at predetermined intervals, a blade extending between the sides of the sheet for engaging the sealed portion and advancing the sheet, and means associated with the blade for reciprocating the blade through a path of travel between the sides of said sheet and progressively moving the sheet in timed relation to the movement of the cutting means.

4. Apparatus for making bags from a doubled thermoplastic sheet which comprises means to engage and cut transversely and seal the sheet at predetermined intervals, a blade extending between the sides of the sheet for engaging the sealed portion and advancing the sheet, means associated with the blade for reciprocating the blade through a path of travel between the sides of said sheet and progressively moving the sheet in timed relation to the movement of the cutting means, and means for opening and holding the finished bag when said bag is cut from the sheet.

5. Apparatus for making bags from a doubled thermoplastic sheet which comprises a hot wire to engage and cut transversely and seal the sheet at predetermined intervals, means for reciprocatingly moving said wire relative to the sheet, a blade extending between the sides of the sheet for engaging the sealed portion and advancing the sheet, means associated with the blade for reciprocating the blade through a path of travel between the sides of said sheet and progressively moving the sheet in timed relation to the movement of the wire, clamping means for holding the sheet as it is cut and sealed, and means for opening and holding the finished bag as the bag is released by the clamping means.

6. Apparatus for making bags from a doubled thermoplastic sheet which comprises means to engage and cut transversely and seal the sheet at predetermined intervals, means including a body extending between the sides of the sheet for delivering a force against a sealed portion of the sheet and advancing said sheet, and means associated with the body for reciprocating said body through a path of travel between the sides of the sheet and progressively moving the sheet in timed relation to the movement of the cutting means.

NORMAN H. NYE.

REFERENCES CITED

The following references are of record in the file of this patent:

UNITED STATES PATENTS

| Number | Name | Date |
|---|---|---|
| 2,051,483 | Jones | Aug. 18, 1936 |
| 2,146,308 | Maxfield | Feb. 7, 1939 |
| 2,157,054 | Gammeter | May 2, 1939 |
| 2,213,602 | Yates | Sept. 3, 1940 |
| 2,232,640 | Schwartzman | Feb. 18, 1941 |
| 2,237,119 | Smith | Apr. 1, 1941 |
| 2,248,471 | Stroop | July 8, 1941 |
| 2,269,533 | Howard | Jan. 13, 1942 |
| 2,272,251 | Robinson | Feb. 10, 1942 |
| 2,326,931 | Dalton et al. | Aug. 17, 1943 |
| 2,330,361 | Howard | Sept. 28, 1943 |
| 2,347,439 | Shea et al. | Apr. 25, 1944 |
| 2,406,018 | Irmscher | Aug. 20, 1946 |
| 2,425,581 | Vincent | Aug. 12, 1947 |